United States Patent Office 3,006,099
Patented Oct. 31, 1961

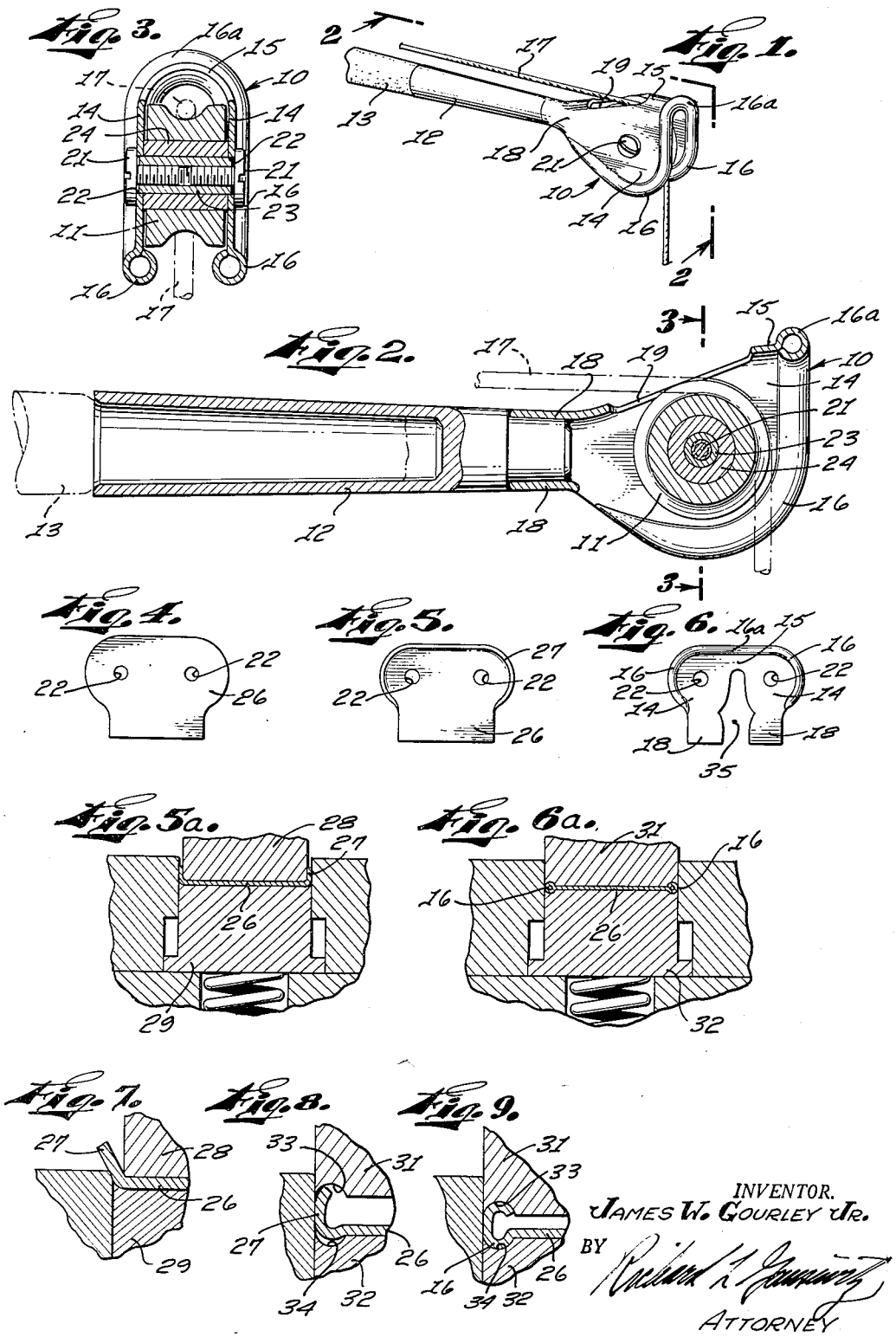

3,006,099
ROLLER TIP FOR FISHING RODS, AND
METHOD OF MAKING THE SAME
James W. Gourley, Jr., La Habra, Calif., assignor to
Axelson Fishing Tackle Mfg. Co., Santa Ana., Calif.,
a corporation of California
Filed Jan. 9, 1959, Ser. No. 785,926
1 Claim. (Cl. 43—24)

This invention relates to a roller tip for fishing rods, and to a method of making the same.

Roller tips for fishing rods have long been employed for the purpose of reducing the friction inherent in sport fishing operations, particularly when relatively large and heavy fish are being sought. Such tips incorporate, in addition to the roller itself, a guide frame adapted to prevent the line from moving off the roller. Such guide frames are frequently rubbed by the line and may effect damage to the line unless smooth and rounded line-engaging surfaces are provided. It has previously been proposed to provide such smooth and rounded surfaces on the guide frame by a number of means, including brazing or soldering of a rounded element onto a base. However, such means and methods are deficient in one or more ways including high cost, difficulty of manufacture, short service life, and unsightliness.

In view of the above factors characteristic of conventional roller tips for fishing rods, and methods for producing the same, it is an object of the present invention to provide a highly efficient, decorative and long-lasting roller tip which may be mass produced at very low cost in comparison to prior-art structures.

A further object is to provide a method of manufacturing a guide frame for fishing line rollers from a sheet metal blank, and in such manner as to produce perfectly rounded edges adapted to engage the fishing line.

A further object is to provide a roller tip which may be readily assembled with minimum cost, yet which will not work loose or become accidently disassembled regardless of the length of time during which the tip is employed.

These and other objects and advantages of the invention will be more fully set forth in the following specification and claims, considered in connection with the attached drawing to which they relate.

In the drawing:

FIGURE 1 is a fragmentary perspective view showing a roller tip, constructed in accordance with the present invention, as mounted on the end of a fishing rod;

FIGURE 2 is an enlarged longitudinal sectional view taken on line 2—2 of FIGURE 1;

FIGURE 3 is a transverse section on line 3—3 of FIGURE 2;

FIGURE 4 is a plan view of the blank from which the guide frame is formed;

FIGURE 5 is a plan view illustrating the blank of FIGURE 4 after the side flange or rim has been provided thereon;

FIGURE 5a is a schematic view illustrating the apparatus and method for forming the flange or rim illustrated in FIGURE 5;

FIGURE 6 is a plan view illustrating the condition of the guide frame blank after the side flange or rim of FIGURE 5 has been formed into a rolled bead, and also after a notch has been punched in the blank;

FIGURE 6a is a schematic view illustrating the method and apparatus for forming the flange or rim of FIGURE 5 into the bead of FIGURE 6;

FIGURE 7 is a greatly enlarged fragmentary view illustrating one portion of the showing of FIGURE 5a, but prior to the time that the side flange or rim has been completely formed;

FIGURE 8 is an enlarged fragmentary view illustrating one portion of the showing of FIGURE 6a, but substantially before completion of the bead; and FIGURE 9 corresponds to FIGURE 8 but illustrates the condition of the parts just prior to the time the bead is completely formed.

Referring first to FIGURES 1–3 of the drawing, the roller tip is illustrated to comprise a guide frame 10 in which is rotatably mounted a roller or sheave 11. Frame 10 is secured to a socket, tube or hollow tip element 12 which, in turn, is mounted over the end of the fishing rod which is schematically indicated at 13.

The guide frame 10 is generally U-shaped, having parallel side flanges or cheek portions 14 and a connecting web or base 15. Side flanges 14 have curved or rounded shapes remote from web 15, and are provided with rolled beads 16 which are disposed adjacent the peripheral portion of roller 11 in order to provide means for maintaining the fish line 17 thereon. A corresponding rolled bead 16a is formed on the connecting web 15, being continuous and integral with the beads 16 on the flanges. Such bead 16a serves as a relatively friction-free means for guiding the line 17, even in unusual situations where the tip is used in angular position so that the roller 11 becomes ineffective.

The side flanges 14 are integral, at their unbeaded portions, with a generally tubular mounting portion which is brazed or otherwise fixedly secured over the outer end of tip element 12, as shown in FIGURE 2. Such tubular mounting portion is formed of two separate semi-cylindrical elements 18 each of which is integral with a side flange 14. It is to be understood that the illustrated tip element 12, which is of bored or machined construction, may be replaced (particularly in the large sizes) with a tube element which does not have a closed end.

An opening 19 is provided between web 15 and elements 18, and is adapted to receive the fish line 17. The line 17 extends through the opening 19, over the roller 11, and between the flange beads 16 as shown in FIGURES 1 and 2. Beads 16 extend sufficiently far over the edges of roller 11 to insure that the line will not shift off the roller.

The roller or sheave 11 may be a machined part, having a peripheral groove adapted to receive the line 17. Means are provided to rotatably mount the roller in the guide frame 10, in a substantially frictionless manner, and compirse screws 21 extended inwardly through central holes 22 in side flanges 14 and threaded into an internally-threaded sleeve or pin 23. An oil-filled porous metal bearing or bushing 24 is mounted around the sleeve 23 and in a central opening in the roller 11, thereby providing for lubricated rotation of the roller.

Bearing or bushing 24 has a length equal to the desired spacing between flanges 14. Pin 23 is made somewhat longer than bushing 24, but somewhat shorter than an amount determined by adding the bearing length to twice the flange thickness. Pin 23 has an outer diameter only slightly less than the diameters of holes 22, so that its ends may extend into such holes as shown in FIGURE 3.

*Method of manufacture*

Proceeding next to a description of the method of manufacture of guide frame 10, and with particular reference to FIGURES 4–9, inclusive, a blank 26 of sheet metal is formed in the shape shown in FIGURE 4, being pierced to provide the holes 22 for screws 21. Such blank 26 is generally oblong and has rounded ends, one side of the oblong being provide with a generally rectangular lateral extension as shown at the bottom in FIGURE 4.

A rim or flange 27 is then formed around the blank 26, except at the above-mentioned rectangular side extension, as indicated in FIGURES 5, 5a and 7. Thus, a punch 28 and knock-out pad 29 are employed (FIGURES 5a and 7) to form the flange 27 and cause the same to be at generally right angles to the body of the blank. It is pointed out that the punch 28 and knock-out pad 29 may each have flat surfaces throughout, and that punch 28 is somwehat smaller than the blank so that the edges of the blank will be bent upwardly around the periphery of the punch and inwardly of the surrounding wall.

Another punch 31 and knock-out and forming pad 32 are then employed, as shown in FIGURES 6a, 8 and 9, to produce the rolled beads 16 and 16a. The punch 31 and pad 32 have peripheral grooves 33 and 34, respectively, which are opposite each other and have similar semi-circular cross-sections. Referring to FIGURE 8, it is pointed out that when the punch 31 moves downwardly onto the rim 27, the extreme upper edge of rim 27 is engaged by a portion of the wall of groove 33 of the punch. The resulting downward pressure causes bending of a peripheral portion of the blank 26 into the opposed groove 34 in pad 32. As soon as an edge portion of the blank is in continuous contact with the wall of groove 34, and assuming that the punch 31 continues its downward movement, the upper edge of the flange 27 has no alternative but to flow around the wall of groove 33 as indicated in FIGURE 9. Continued downward movement of punch 31 to engage the center part of blank 26 (FIGURE 6a) results in the rounded bead 16. It is pointed out that the bead 16 is raised in both directions from the body of blank 26, and is substantially perfectly rounded in order to eliminate any possibility of injury to the fish line.

The element resulting from the process described with relation to FIGURES 6a, 8 and 9 is then notched as indicated at 35 in FIGURE 6. A portion of such notch 35 becomes the opening 19, previously described, but a portion of the notch is eliminated when the elements 18 on opposite sides thereof are brought together and curved to fit around the tip 12 as previously stated.

As the next step in the method, the element shown in FIGURE 6 is formed into U-shape by suitable die means. Thereafter, the elements 18 are formed into a substantially continuous tube, also by suitable die means. The latter operation closes the end of opening 19 remote from web 15. The notch 35 is so developed that opening 19 will be rounded, as indicated, and sufficiently large to receive the roller assembly.

The frame 10 is thus completed, and is brazed to the tip 12. The frame and tip assembly is then heavily chrome plated.

It is then merely necessary to insert the sub-assembled roller 11 and bearing 24 through opening 19. The pin 23 is then inserted through holes 22 and through bearing 24, and screws 21 are tightened in position to complete the assembly.

Should the flanges 14 be initially too close together, they are spread to the desired distance by the bearing 24 which acts as a spacer. On the other hand, should flanges 14 initially be too far apart, they are sprung together by screws 21 until they seat on the ends of bearing 24. Accordingly, the clearance between the side walls of roller 11 and the inner walls of the flanges 14 is accurately determined by the bearing and spacer 24.

Bearing 24 is locked against rotation by the flanges 14 due to tightening of screws 21. Pin 23, as previously indicated, is insufficiently long to prevent the screw heads from tightly seating the flanges on the bearing ends. The roller 11 rotates freely on the locked bearing 24, and cannot produce a torque tending to effect unthreading of a screw 21.

Should it be desired to disassemble one of the devices, it is merely necessary to remove a screw 21 and pull out pin 23, after which roller 11 and bearing 24 may be moved through opening 19. This would not be possible if pin 23 were the same length as bearing 24, and if holes 22 had smaller diameters.

The sheet metal employed in the manufacture of frame 10 may be brass, in order to avoid work hardening. The roller 11 and screws 21 are formed of stainless steel; pin 23 is formed of brass; and bearing 24 may be (for example) and oil-impregnated porous material (trademarked "Oilite") as previously stated.

Various embodiments of the present invention, in addition to what has been illustrated and described in detail, may be employed without departing from the scope of the accompanying claim.

I claim:

A roller tip for fishing rods comprising a socket member adapted to fit over the end of fishing rod, a combined line guide frame and fishing line roller support comprising a generally U-shaped unitary sheet metal element having opposed side flanges or cheeks with rounded peripheral portions and a connecting web portion, said side flanges defining between them a peripheral opening, said frame including a tubular mounting portion fitting over and secured to said socket member and comprising a pair of semi-cylindrical attaching members each integral with one of said opposed side flanges or cheeks and extending rearwardly therefrom, said cheeks being provided at their rounded peripheral portion with a continuous rolled over bead portion outlining the entire opening formed between said cheeks and extending continuously from points adjacent said semi-cylindrical attaching members along the boundary of the opening formed between the cheek members and including the margin of the web portion, said web portion being cut away between the bead portion and the tubular mounting portion to provide a top opening of sufficient size to permit insertion or removal of a line guiding roller, and adapted to receive a line entering through said opening in said web passing over said roller and outwardly between the beaded peripheral portions of said cheeks, said roller being detachably mounted in said frame and of such size as to substantially fill the space between the opening in the web and the opening between said cheeks, said frame and roller providing line guiding means for the fishing line entering the frame through the opening in the web passing over said roller and outwardly through the space between the peripheral beaded portions at the margins of the cheeks.

References Cited in the file of this patent

UNITED STATES PATENTS

| | | |
|---|---|---|
| 2,502,846 | Hoffman | Apr. 14, 1950 |
| 2,878,609 | O'Brien | Mar. 24, 1959 |

FOREIGN PATENTS

| | | |
|---|---|---|
| 1,116,582 | France | Feb. 6, 1956 |